(12) United States Patent
Nasiri et al.

(10) Patent No.: US 7,778,400 B2
(45) Date of Patent: Aug. 17, 2010

(54) CENTRALIZED PERSONAL DIRECTORY SCHEME FOR COMMUNICATIONS NETWORKS

(75) Inventors: Katayoun Nasiri, Kanata (CA); Paul Andrew Erb, Ottawa (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 1262 days.

(21) Appl. No.: 11/259,090

(22) Filed: Oct. 27, 2005

(65) Prior Publication Data

US 2007/0116219 A1    May 24, 2007

(51) Int. Cl.
*H04M 1/56*    (2006.01)
*H04M 15/06*    (2006.01)

(52) U.S. Cl. .............. 379/142.01; 379/142.06; 379/142.1; 379/207.15

(58) Field of Classification Search ............ 379/142.01, 379/142.04, 142.06, 142.1, 142.17, 207.14, 379/207.15, 355.02, 355.07, 355.08, 355.09
See application file for complete search history.

(56) References Cited

U.S. PATENT DOCUMENTS

| | | | |
|---|---|---|---|
| 5,802,396 A | 9/1998 | Gray | |
| 6,301,353 B1 | 10/2001 | Maclsaac et al. | |
| 6,324,272 B1 * | 11/2001 | Abu-Shukhaidem et al. | 379/142.06 |
| 6,449,475 B1 * | 9/2002 | Chinnaswami | 455/415 |
| 6,542,591 B1 * | 4/2003 | Amro et al. | 379/142.01 |
| 6,658,455 B1 | 12/2003 | Weinman, Jr. | |
| 6,707,897 B2 * | 3/2004 | Nishida | 379/188 |
| 6,813,344 B1 * | 11/2004 | Lemke | 379/142.06 |
| 6,816,589 B2 | 11/2004 | Pinard | |

FOREIGN PATENT DOCUMENTS

| | | |
|---|---|---|
| GB | 2370721 A | 3/2002 |
| WO | 94/24802 | 10/1994 |

* cited by examiner

*Primary Examiner*—Quoc D Tran

(57) ABSTRACT

An apparatus and method for personalized calling party number determination and identification. The apparatus includes an interface for receiving a calling party number corresponding to a calling party, a memory for storing an alpha tag corresponding to the calling party number, and a processor coupled to the interface. The processor includes instructions to determine a character indicating presence of a character string including a unique identifier portion, a classification portion, and a calling party portion. The processor correlates the alpha tag to the calling party upon matching the calling party portion of the character string to the calling party number stored in the memory. The method of personalized calling party number determination and identification can occur for incoming or outgoing call messages relative to the communications network including the apparatus.

15 Claims, 4 Drawing Sheets

CENTRALIZED PERSONAL DIRECTORY SCHEME FOR COMMUNICATIONS NETWORKS

FIELD OF THE INVENTION

The present invention relates generally to providing personalized caller identification. More particularly, the present invention relates to providing a centralized personal directory scheme with corresponding digit tree processing within a communications network.

BACKGROUND OF THE INVENTION

Within the field of telecommunications, the concept of calling party identification (i.e. "caller ID") is a well known. Caller ID is currently used within either landline or mobile telecommunications. In such known caller ID systems, each caller has a corresponding unique identifier typically in terms of the caller's telephone number. A mechanism on the called party end of the communications link is enabled to distinguish and display such unique identifier prior to fully establishing a communication link. While such a system is useful, there is the limitation that the unique identifier in the form of the callers telephone number is only useful if the called party recognizes the actual telephone number. To alleviate this, alpha tagging allows users to associate a text string with any given caller ID (or extension number) that is displayed on their telephone set when receiving or making a call involving that caller ID (or extension number). The text string is personal to the user and the same caller ID may be included in the personal directory of more than one user. For example, several users may have different alpha tags for the same number—e.g., the number for "Dino's Pizzeria & Take-Out" could be "Pizza" for one user, "Delivery" for another user, and "Dinner" for yet another user.

Some telephones and other physical telecommunications devices implement alpha tagging by enabling a user to store several phone numbers and associate such phone numbers with an alphabetic name or term. For instance, (613) 555-2323 may correspond to a particular take-out restaurant focusing on vegetarian food and operating under the name of "Veggies On The Run." A patron of such restaurant may program their telephone to associate "Veggies" to correspond with (613) 555-2323. If such restaurant were to call the patron, the caller ID mechanism with their telephone would recognize (613) 555-2323 and display the associated, pre-stored term "Veggies" on the patron's caller ID display. Similarly, the same telephone could be used to store other frequent contacts and associated telephone numbers. When an incoming call arrives, the personal directory of stored alpha tags and numbers is referenced to determine whether a text string has been configured for the instant caller ID (or extension number). If so, the text string is displayed on the device rather than the caller ID (or extension number). A system directory can also be referenced when no personal directory entry exists. Additionally, if desired a department/tenant scope directory can also be used before checking the system directory to provide more flexibility in alpha tagging delivery. Such systems are limited, however, by the memory of the telephone or device used to store the alpha tag and number data. While memory storage capacity has become less of a concern as the cost of memory has been reduced over time, access time can be a considerable issue if a significant amount of fixed memory allocation is to be scanned.

In addition to maintaining a personal directory within a telephone or some such telecommunications device itself, the personal directory may be more centralized. Within such centralized systems, independent personal directory facilities may exist for a group of users that would require considerable system memory space. Such centralized systems often limit each user to a fixed personal directory size of only 10 or 20 possible entries. Alternatively, a hash mechanism (or resource management facility) is used to share a pool of personal directory entries between all users or groups of users. The hash mechanism identifies a hash table bucket that is a linked list or table of entries. Each entry includes the user identity, the full caller ID (or significant abbreviation), and the associated alpha tag. A caller ID (or extension number) is then transformed into a hash table bucket, many to one, and the corresponding bucket entries are searched for the matching caller ID and user identifier.

Within local networks such as a corporate enterprise setting, such access time and memory allocation issues become significant concerns. It is, therefore, desirable to provide an improved and robust caller identification mechanism for use within such communications networks.

SUMMARY OF THE INVENTION

It is an object of the present invention to obviate or mitigate at least one disadvantage of previous caller identification mechanisms. The present invention therefore provides a centralized personal directory scheme having corresponding digit tree processing and useful within a communications network. The present invention uses digit tree processing along with a non-dialable digit capability in order to provide for direct de-referencing of personal numbers where no searching of entries is required. The present invention also prevents collisions in data configuration/manipulation between users (or systems). As well, the present invention distinguishes between internal and external numbers (and other categories). Further, the present invention is applicable to corporate alpha tagging as well as personal alpha tagging, including department/tenant delineation. The present invention can support a downloadable personal directory for provisioning any applicable software interface by downloading the associated digit tree branch of the present invention. Still further, the present invention can support "wild card" digits and dialing conflict resolution automatically. Moreover, fixed allocation of system memory space is not required for personal directories implemented via the present invention.

In a first aspect, the present invention provides an apparatus for personalized calling party number determination and identification, the apparatus including an interface for receiving a calling party number corresponding to a calling party, a memory for storing an alpha tag corresponding to the calling party number, and a processor coupled to the interface. The processor includes instructions to determine a character indicating presence of a character string including a unique identifier portion, a classification portion, and a calling party portion, wherein the processor correlates the alpha tag to the calling party upon matching the calling party portion of the character string to the calling party number stored in the memory.

In a further embodiment, there is provided a method for personalized calling party number determination and identification, the method including receiving from a calling party a call message within a communications network, determining from the call message, a non-diallable character indicating presence of a character string including a unique identifier portion, a classification portion, and a calling party portion, upon determination of the non-diallable character, correlating a stored alpha tag with the calling party upon matching the calling party portion of the character string to a stored calling party number, and displaying the stored alpha tag.

In a further aspect, the present invention provides a method for personalized calling party number determination and identification, the method including receiving, within a communications network, an outgoing call message to a known calling party number, determining from the call message, a non-diallable character indicating presence of a character string including a unique identifier portion, a classification portion, and a calling party portion, upon determination of the non-diallable character, correlating a stored alpha tag with the known calling party number upon matching the calling party portion of the character string to a stored calling party number; and displaying the stored alpha tag.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides a method and system for providing personalized caller identification including a centralized personal directory scheme with corresponding digit tree processing within a communications network. For purposes of clarity, the invention is described in terms of incoming calls only. However, it should be readily apparent that the present invention applies to both incoming and outgoing calls such that a personal directory may be used for outgoing calls as well as incoming calls With reference to FIG. 1, a basic digit tree building block is shown and includes fields (nodes) for numeric digits 0 through 9 along with the "*" and "#" characters. To avoid increasing the storage requirements of digit string pools, the digit block shown also includes nodes for time out (T), pause (P), and flash (F). Three wildcard digits, N, X, and Y are allotted for other features not related to the present discussion. In accordance with the present invention, the basic digit tree building block shown also includes a node for a special character (I). This special character is described further below.

Figure 2:
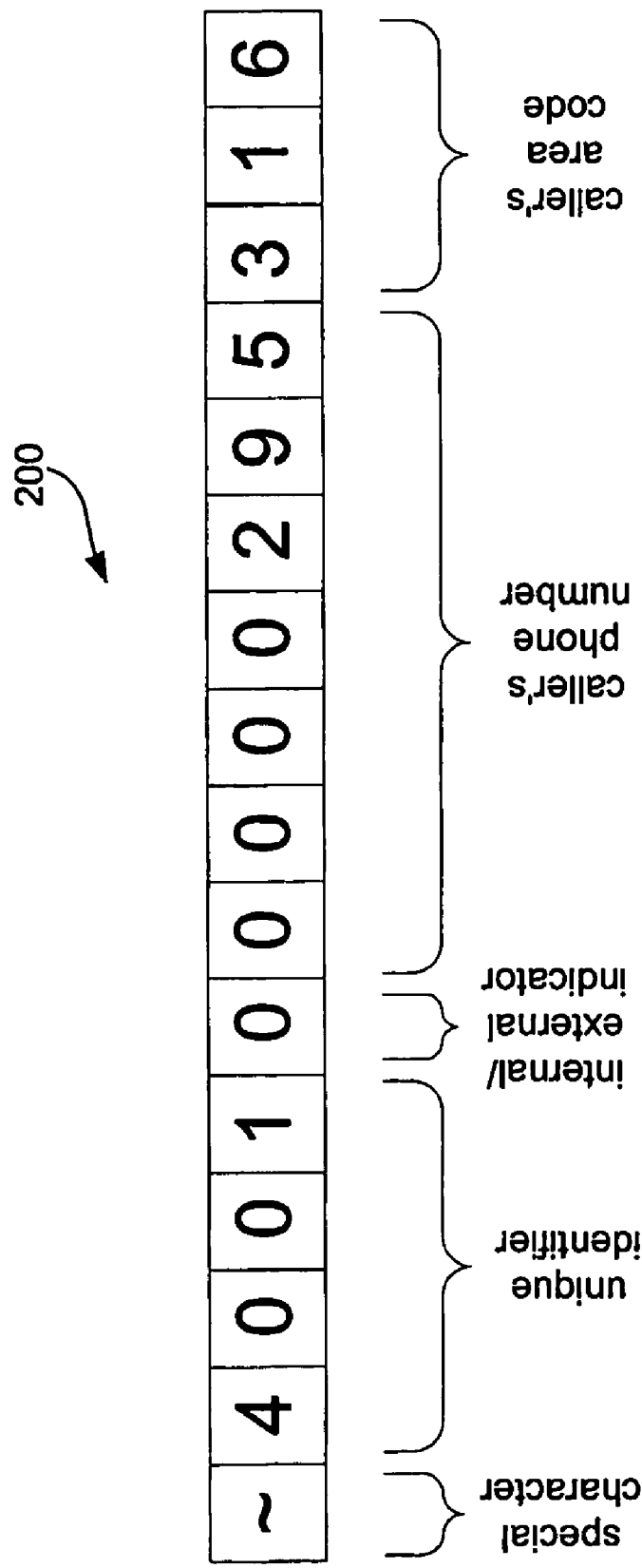
FIG. 2 is a schematic illustrating a special string in accordance with the present invention.

FIG. 2 shows one possible embodiment of a special string 200 of the present invention including the special character, unique identifier, classification indicator. (i.e., internal/external indicator), caller's phone number, and caller's area code. In the example shown, the special character is a "~" character, but may of course be any single or multiple characters. The unique identifier is the given called number that, for instance, may be indicated as "4001" for "extension 4001" within a corporate communications network. Such extensions may of course be longer or shorter and the related unique identifiers would therefore be longer or shorter correspondingly. The internal/external indicator may be a single character indicating the nature of the caller's number—e.g., "1" for internal, "0" for external—and may also be other single or multiple characters depending upon the variety of caller types in any given system.

Figure 1:
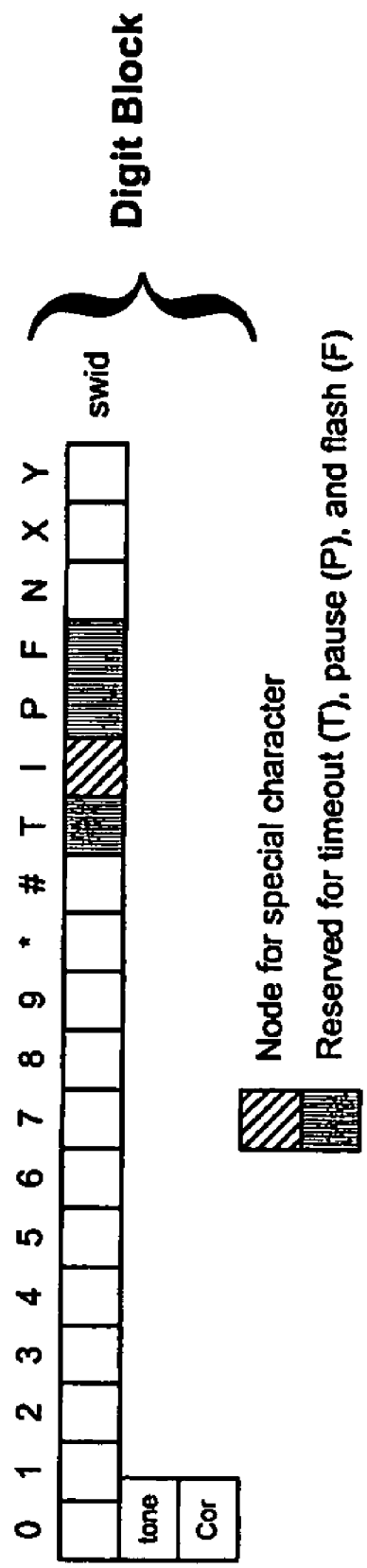
FIG. 1 is a schematic illustrating a digit block including a special character node in accordance with the present invention.
Figure 3:
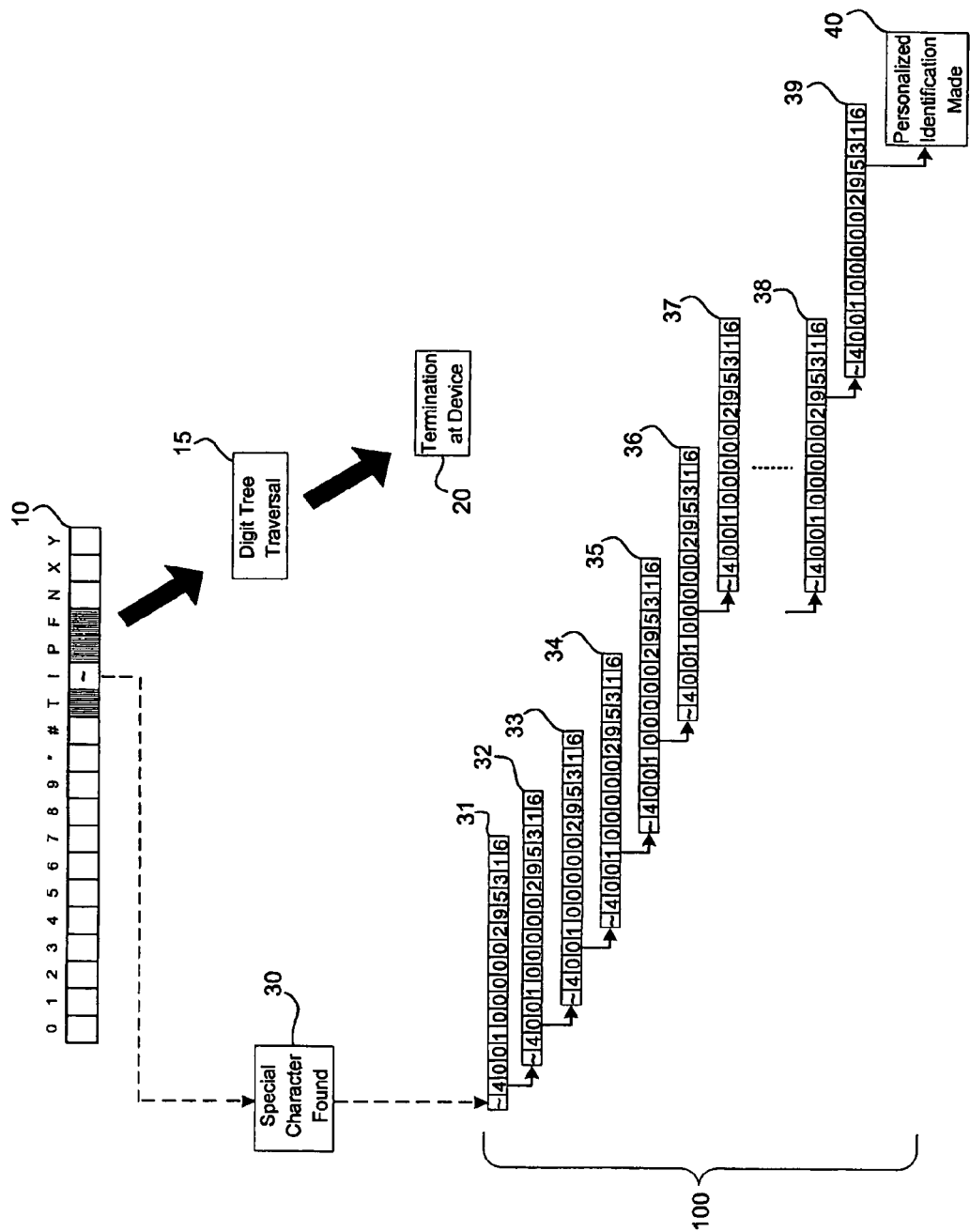
FIG. 3 is a schematic illustrating digit tree traversal of the digit block shown in FIG. 1 along with parallel generation and traversal of the special string shown in FIG. 2 in accordance with-the present invention.

With reference to FIG. 3, a digit block 10 as described in regard to FIG. 1 including the special character as "~" mentioned above in regard to FIG. 2. Traversal of the digit tree is represented by element 15 and is accomplished in a known manner including, but not limited to, a call processing engine is typically used for processing the called number and includes one or more known type of computer processors. In the instance shown, the called number includes a special character "~" though it should be understood that not all incoming calls will include such special character such that the incoming call can be processed in like manner with or without the special character to arrive at the termination device 20. In other words, the call processing engine receives digits and performs digit translation until a termination 20 is found at a device that corresponds to the called number. The special character is a hidden, non-diallable digit, for example "~", within the system digit tree for use as a prefix to alpha tagging digit tree entries. In parallel with digit translation 15, the special character is identified 30 whereby a special string is generated and further processed by a special digit tree processing 100 formed by digit blocks 31 through 39. Blocks between digit blocks 37 and 38 are omitted for clarity of illustration.

It should be understood that other characters may be included within each digit block, in addition to numerals 0 through 9 and the special character "~", such as field delimiters (not shown for clarity). Such field delimiters may be used to indicate where, for instance, the unique identifier ends and the internal/external indicator begins. The field delimiter could be any character such as, but not limited to, "*" or "#". Such field delimiters may be useful especially when the unique identifier is within a range of digits. For example, the unique identifier may be only four digits as shown in FIG. 2, may be only three, or may be as many as seven digits depending upon the number of extensions within the communications network utilizing the invention. Alternatively, the field delimiter may be omitted altogether if the information regarding the internal/external indicator were to be retained upon generation of the special string. This information regarding internal/external context could be retained, for instance, within a journal block as an internal/external flag during digit translation along with other information typically retained during normal translation operations.

The special digit tree processing 100 subsequent to identification of the special character, e.g., "~", first processes the unique user identifier (preferably the user's extension number) as shown at digit blocks 31 through 34. The processing indicated at a block 35 shows processing of a classification indicator. The classification indicator shown preferably indicates a "1" for calls made internal to a network (e.g., intracorporate) and a "0" for call made external to a closed network (e.g., from the public switched telephone network, PSTN). The caller ID digits indicating the digits of the calling external number (or extension number if deemed internal) are processed via blocks 36 through 39. The example shown may be for a caller ID of "613-592-0000."

It should be noted the area code "613" may or may not be considered in digit translation depending upon the given implementation of the present invention. As shown in FIG. 2, the final block 39 ends with translation of the digit "5" as the final translation before personalized identification 40 is made that associates the abbreviated number 592-0000 with some stored alpha tagging text string—e.g., "Veggies Restaurant" for the caller ID "592-0000." Still further, it should be readily apparent as suggested above that a classification indicator of, for example "1" indicating an internal (e.g., intra-corporate) caller ID may require even less digit translation because only three, four, or five extension digits would be necessarily processed in most types of corporate enterprise systems.

With further reference to FIG. 2, the caller's phone number obtained as caller ID for an incoming call, or as a keypad entry for an outgoing call, would include a standard seven characters along with three more characters for the callers area code. The caller's phone number and caller's area code would preferably be arranged in reverse order. For example, the special string 200 shown in FIG. 2 is indicative of a caller having the phone number (613) 592-0000 where the called extension is 4001. It is possible to implement the present invention without reversing the order of digits. However, digit matching to any given personalized identification (e.g., "Veggies Restaurant") would be facilitated by identifying the most specific possible match (i.e., extensions such as "0000") prior to the most general possible match (i.e., area codes such as "613"). This would accordingly reduce processing time in an advantageous manner. Further, if the classification indicator reveals that the caller is an internal number, and then perhaps only the first four subsequent characters would be necessary to translate in the digit translation process (shown as 100 in FIG. 3).

Figure 4:
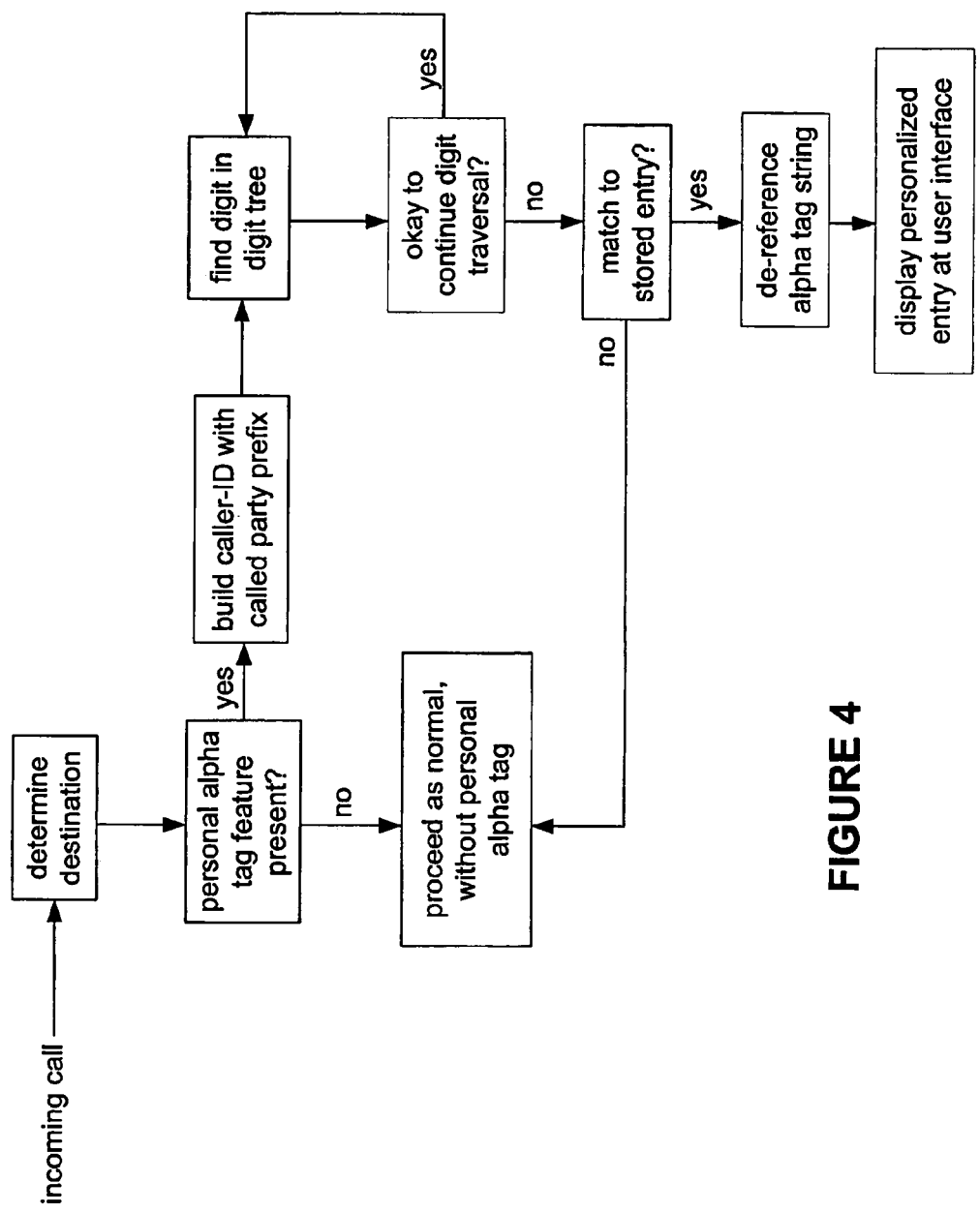
FIG. 4 is a flowchart showing the methodology of alpha tag de-referencing in accordance with the present invention.

In regard to FIG. 4, a flowchart illustrating the methodology of alpha tag de-referencing in accordance with the present invention is shown. In each call instance, the incoming call will of course have the call destination determined and if the personal alpha tag feature is deemed present by the identification of the special character, then a special string is generated. The special string is built in accordance with that shown in FIG. 2 by building upon the caller-ID with the called party prefix. If no special character is found, then no further action in regards to the invention is taken. This is of course possible, as the present invention is an optional feature. If found though, and after the special string is generated, the digits are traversed until no further digits remain to traverse. Upon such instance, the digit traversal will ideally point to a swid (software ID) that will correspond to a stored entry. If no match is made, then of course no action need be taken. However, upon indication of a match, the special string will then de-reference an alpha tag string that corresponds to a personalized entry. That entry is then displayed on some user interface utilizing the present invention. Such interface may be a desktop telephone set, a software based computer screen interface, or any related interface including, but not limited to, audio and/or visual mechanisms. For instance, the alpha tag string may be translated into an audio form by use of a .wav file or the like.

As suggested above, further alternatives in terms of the classification indicators are possible and considered to be well within the intended scope of the present invention. For instance, additional classification indicators can be used to further distinguish between types of entries in the personal digit tree other than simply internal and external calling parties. Such entries would not be limited to directory numbers but could also apply to alpha tagging for account codes, as an example. An indicator of whether the alpha tagging text string is private may also be stored within the digit sequence (or associated with the text string itself). The privacy indicator would be used to prevent display of the entry in a system configuration.

Yet further, the hidden, non-diallable digit may be any single identifier or combination of identifiers that would prefix the personal directory entries. As well, the use of a digit tree may be replaced by any other mechanism for managing digit translations. The digit tree mechanism may be expanded to include alphanumeric characters (in addition to the standard dialable digits) for application in areas where digits are insufficient.

It is yet further appreciable that the present invention could also be applied to management of personal contacts within a corporate contact database (where contacts are indexed by telephone numbers). In such instance, the prefix identifier can be used to ensure only authorized individual(s) can view and/or modify the entries. By extension, the present invention may be applied when a user has access to personalize (or of limited access) data stored in a centralized (or distributed/replicated) repository. Further, the present invention may be applied where users are uniquely identified by a user ID that are each used to access their data within the repository.

In operation, the special string of the present invention results in a unique and useful method of digit translation. Specifically, a method is implemented to translate a given caller ID (or extension number) into a digit string using a given user identifier. As well, the method includes insertion or removal of a text string reference in the digit tree using the digit string provided by the aforementioned method and described in detail above. In addition, the present inventive digit tree translation method serves to de-reference an associated text string using a digit string and applying appropriate abbreviation matching rules based on classification indicator as described above. Within such inventive method, the Caller ID that a user enters in their personal directory is reversed when stored in the digit tree to facilitate matching of abbreviated digits. Abbreviated digits are considered to be any shortened string of digits less than the extended (i.e., full) phone number such as "1-(613)-592-0000". The method applies the classification indicator to distinguish between the significant abbreviation that can be applied. Numbers designated as internal cannot be abbreviated and must match exactly (for example, 004 is not a valid match for 2004). Numbers designated as external will match if the abbreviated form matches the caller ID dialed or received on an incoming call. In such a way, the area code may be ignored so long as duplicates do not exist for the abbreviations.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. An apparatus for personalized calling party number determination and identification, said apparatus comprising:
   an interface for receiving a calling party, wherein number corresponding to a calling party said calling party number comprises a standard caller identification (caller ID);
   a memory for storing an alpha tag corresponding to said calling party number; and
   a processor comprising a call process engine using digit tree processing coupled to said interface, said processor including instructions to determine a hidden, non-diallable character indicating presence of a character string including a unique identifier portion, a classification portion, and a calling party portion;

wherein said processor correlates said alpha tag to said calling party upon matching said calling party portion of said character string to said calling party number stored in said memory, and wherein said classification portion of said character string includes one or more characters to indicate whether said calling party is internal or external relative to a communications network that includes said apparatus.

2. The apparatus as claimed in claim 1, wherein said calling party portion includes a caller's extended phone number.

3. The apparatus as claimed in claim 1, wherein said calling party portion is capable of including a caller's extended phone number.

4. The apparatus as claimed in claim 1, wherein said calling party portion is capable of including a caller's abbreviated phone number.

5. The apparatus as claimed in claim 1, wherein said memory resides centrally within said communications system that includes said apparatus.

6. A method for personalized calling party number determination and identification, said method comprising:
   receiving, at an interface of said communications network, from a calling party a call message within said communications network comprising a standard caller identification (caller ID) associated with said calling party;
   determining from said call message, a non-dialable character indicating presence of a character string including a unique identifier portion, a classification portion, and a calling party portion;
   upon determination of said non-dialable character, correlating a stored alpha tag with said calling party upon matching said calling party portion of said character string to a stored calling party number; and
   displaying said stored alpha tag,
wherein said stored alpha tag is a user-generated alphabetic identifier stored within a centralized memory of said communications network, and
wherein said determining and correlating steps occur within a call process engine using digit tree processing, and
wherein said classification portion of said character string includes one or more characters to indicate whether said calling party is internal or external relative to said communications network.

7. The method as claimed in claim 6, wherein said calling party portion includes a caller's extended phone number.

8. The method as claimed in claim 6, wherein said calling party portion is capable of including a caller's extended phone number.

9. The method as claimed in claim 6, wherein said calling party portion is capable of including a caller's abbreviated phone number.

10. The method as claimed in claim 6, wherein said call message is an incoming message to said communications network.

11. The method as claimed in claim 6, wherein said call message is an outgoing message from within said communications network.

12. A method for personalized calling party number determination and identification, said method comprising:
   receiving, at an interface of a communications network, an outgoing call message to a known calling party number comprising a standard caller identification (caller ID) associated with said known calling party number;
   determining from said call message, a non-dialable character indicating presence of a character string including a unique identifier portion, and a calling party portion;
   upon determination of said non-dialable character, correlating a stored alpha tag with said known calling party number upon matching said calling party portion of said character string to a stored calling party number, and
displaying said stored alpha tag,
wherein said stored alpha tag is a user-generated alphabetic identifier stored within a centralized memory of said communications network, and
wherein said determining and correlating steps occur within a call process engine using digit tree processing, and
wherein said classification portion of said character string includes one or more characters to indicate whether said known calling party number is internal or external relative to said communications network.

13. The method as claimed in claim 12, wherein said calling party portion includes a known caller's extended phone number.

14. The method as claimed in claim 12, wherein said calling party portion is capable of including a known caller's extended phone number.

15. The method as claimed in claim 12, wherein said calling party portion is capable of including a known caller's abbreviated phone number.

\* \* \* \* \*